United States Patent
Woiler

(10) Patent No.: US 9,205,534 B2
(45) Date of Patent: Dec. 8, 2015

(54) CLAMP

(71) Applicant: Key Technology, Inc., Walla Walla, WA (US)

(72) Inventor: Christopher A. Woiler, College Place, WA (US)

(73) Assignee: KEY TECHNOLOGY, INC., Walla Walla, WA (US)

( * ) Notice: Subject to any disclaimer, the term of this patent is extended or adjusted under 35 U.S.C. 154(b) by 235 days.

(21) Appl. No.: 13/909,902

(22) Filed: Jun. 4, 2013

(65) Prior Publication Data

US 2014/0352116 A1   Dec. 4, 2014

(51) Int. Cl.
*B25B 5/08* (2006.01)
*B25B 5/12* (2006.01)
*F16B 2/18* (2006.01)

(52) U.S. Cl.
CPC ... *B25B 5/08* (2013.01); *B25B 5/12* (2013.01); *F16B 2/185* (2013.01); *Y10T 24/44291* (2015.01); *Y10T 24/44453* (2015.01)

(58) Field of Classification Search
CPC ............ B25B 5/08; B25B 5/12; B25B 5/163; B25B 5/006
USPC .......... 269/228, 236, 201, 196, 6, 32; 81/367, 81/374
See application file for complete search history.

(56) References Cited

U.S. PATENT DOCUMENTS

| | | | |
|---|---|---|---|
| 2,600,584 A | 4/1947 | Snell | |
| 2,995,794 A * | 8/1961 | Hacking | 81/373 |
| 3,170,214 A * | 2/1965 | Cochrane | 269/228 |
| 5,152,497 A | 10/1992 | Bissell | |
| 5,410,783 A | 5/1995 | Stoelinga | |
| 6,116,588 A | 9/2000 | Yamane | |
| 6,450,555 B1 | 9/2002 | Collister et al. | |
| 6,595,507 B2 | 7/2003 | Dykstra | |
| 7,607,280 B2 | 10/2009 | Dussault | |
| 7,621,515 B2 | 11/2009 | Jurcinsky et al. | |
| 7,648,131 B2 | 1/2010 | Hagan et al. | |
| 7,878,492 B2 | 2/2011 | Dykstra | |
| 8,613,433 B2 | 12/2013 | Poole et al. | |
| 2012/0043710 A1 | 2/2012 | Clark | |

OTHER PUBLICATIONS

PCT Search Report dated Jan. 16, 2014.

* cited by examiner

*Primary Examiner* — Lee D Wilson
*Assistant Examiner* — Seahee Yoon
(74) *Attorney, Agent, or Firm* — Randall Danskin P.S.

(57) ABSTRACT

A clamp is described and which includes a moveable object engagement member having a distal end which is movable along a predetermined path of travel between an open and closed position; and a moveable force application assembly pivotally cooperating with the moveable object engagement member, and which is used to move the object engagement member along the predetermined path of travel between the opened and closed positions.

18 Claims, 10 Drawing Sheets

CLAMP

TECHNICAL FIELD

The present invention relates to a clamp, and more specifically to a hand actuatable clamp that has superior holding capacity, and further releasably and securably engages an object of interest.

BACKGROUND OF THE INVENTION

The prior art is replete with examples of various clamp arrangements which are useful to forcibly engage objects of interest during a manufacturing process, for example, so as to retain the object of interest in a desirable location during a processing step. Examples of prior art clamps useful for holding or otherwise securing objects of interest are seen in U.S. Pat. Nos. 6,595,507 and 7,648,131, the teachings of which are incorporated by reference, herein. While clamps of the type described in the previous prior art patents operate with various degrees of success, such clamps are typically employed in an arrangement whereby the clamp, itself, is not subjected to significant amounts of vibration while it is in use.

For example, and in connection with the use of various vibratory conveyors, various objects of interest, such as sorting screens, foraminous containers, and other objects of interest need to be periodically and appropriately positioned in a given location along the conveyor bed of a vibratory conveyor so as to process a stream of products in an appropriate manner. Clamps are often employed in this arrangement so as to allow the quick removal of these objects of interest for cleaning, or repair and replacement as necessary. However, the prior art clamps and other arrangements which have been used to temporarily secure such objects of interest on a vibratory conveyor bed, for example, have not worked with a great degree of success because the clamp arrangements often provide less than satisfactory securing force such that the objects of interest often are not retained in an appropriate position, or personnel employing such clamps use them in an improper way. Still further, when the aforementioned prior art clamps are released from the object of interest, the vibratory energy of the vibratory conveyor often imparts adverse motion to the clamp, potentially causing damage to the clamp or to the associated vibratory conveyor bed on which it is deployed.

A clamp which can be utilized to firmly secure an object of interest and be employed in an environment where the clamp is repeatedly exposed to continuous vibratory motion is the subject matter of the present application.

SUMMARY OF THE INVENTION

A first aspect of the present invention relates to a clamp which includes a main body defined in part by spaced, opposite side plates, and wherein the main body is secured to an adjacent supporting surface; a moveable object engagement member which is borne by, partially rotatable, and longitudinally moveable relative to the opposite side plates, and along a predetermined path of movement between an opened and closed position; and a moveable force application assembly pivotally cooperating with the opposite side plates, and disposed in force transmitting relation relative to the moveable object engagement member, and which further, when moved along a given course of travel, applies force to the moveable object engagement member to urge the moveable object engagement member along the predetermined path of travel between the opened and closed position.

Still another aspect of the present invention relates to a clamp which includes a main body having spaced, substantially parallel, side plates, and which further has a lowermost peripheral edge which is secured to an underlying supporting surface, and an uppermost peripheral edge which defines, at least in part, a curved caroming surface, and wherein the respective side plates each have a first, and an opposite, second end; a shoulder fastener coupling the first end of each of the side plates together; a first and a second fixed pin which individually extend between, and couple together the first and second side plates, and wherein the respective fixed pins are each located in a substantially perpendicular orientation relative to each of the side plates, and are further disposed in a predetermined, parallel, spaced orientation, one relative to the other; a handle having a proximal end which is pivotally affixed to the first end of each of the side plates by the shoulder fastener, and which further has an opposite second end, and wherein the handle is reciprocally moveable along a given course of travel between a first and a second position; a moveable object engagement member having a first and a second end, and top and bottom peripheral edges, and wherein a first and a second movement defining passageway is formed in, and extends through the moveable object engagement member, and the first fixed pin is received through the first movement defining passageway, and the second fixed pin is received through the second movement defining passageway, and wherein a clevis engaging region is defined by the top peripheral edge, and is further located near the first end of the moveable object engagement member; an elongated moveable clevis assembly having a first end which is pivotally mounted on the first end of the moveable object engagement member, and which further matingly cooperates with the clevis engaging region thereof, and further has a distal second end which matingly and moveably cooperates with the second end of the handle, and wherein the first end of the moveable clevis assembly cammingly engages the curved camming surface which is defined by the uppermost peripheral edge of each of the respective side plates; and a biasing member positioned between the first end of the elongated moveable clevis assembly and the handle, and which biasingly retains the handle in either the first or second position, and wherein movement of the handle between the first and second positions is effective in urging the moveable object engagement member along a predetermined path of travel from an open position, to a closed position, and wherein in the closed position the second end of the moveable object engagement member forcibly engages an object of interest.

These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
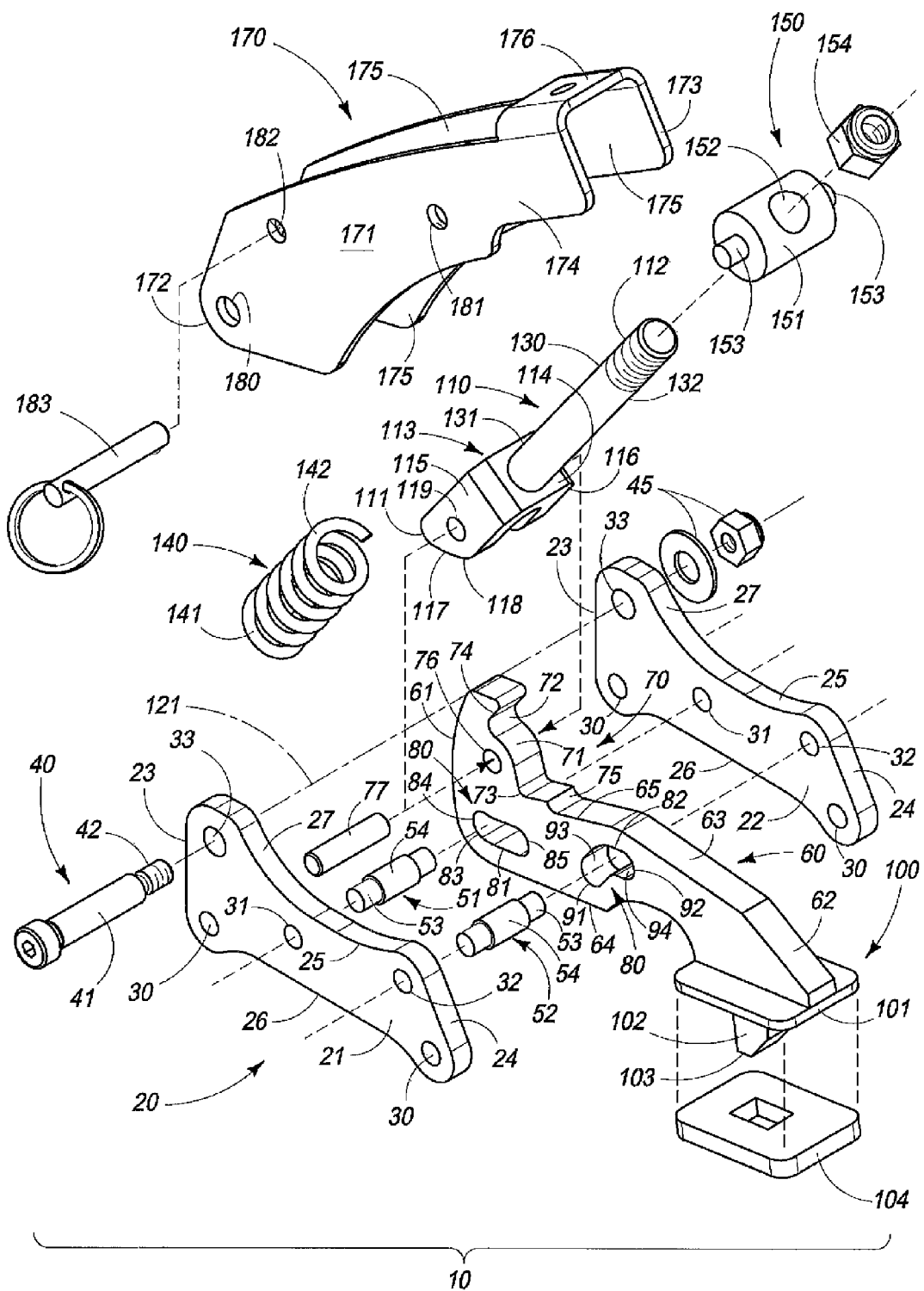
FIG. 1 shows an exploded, perspective view of the clamp of the present invention.
Figure 6:
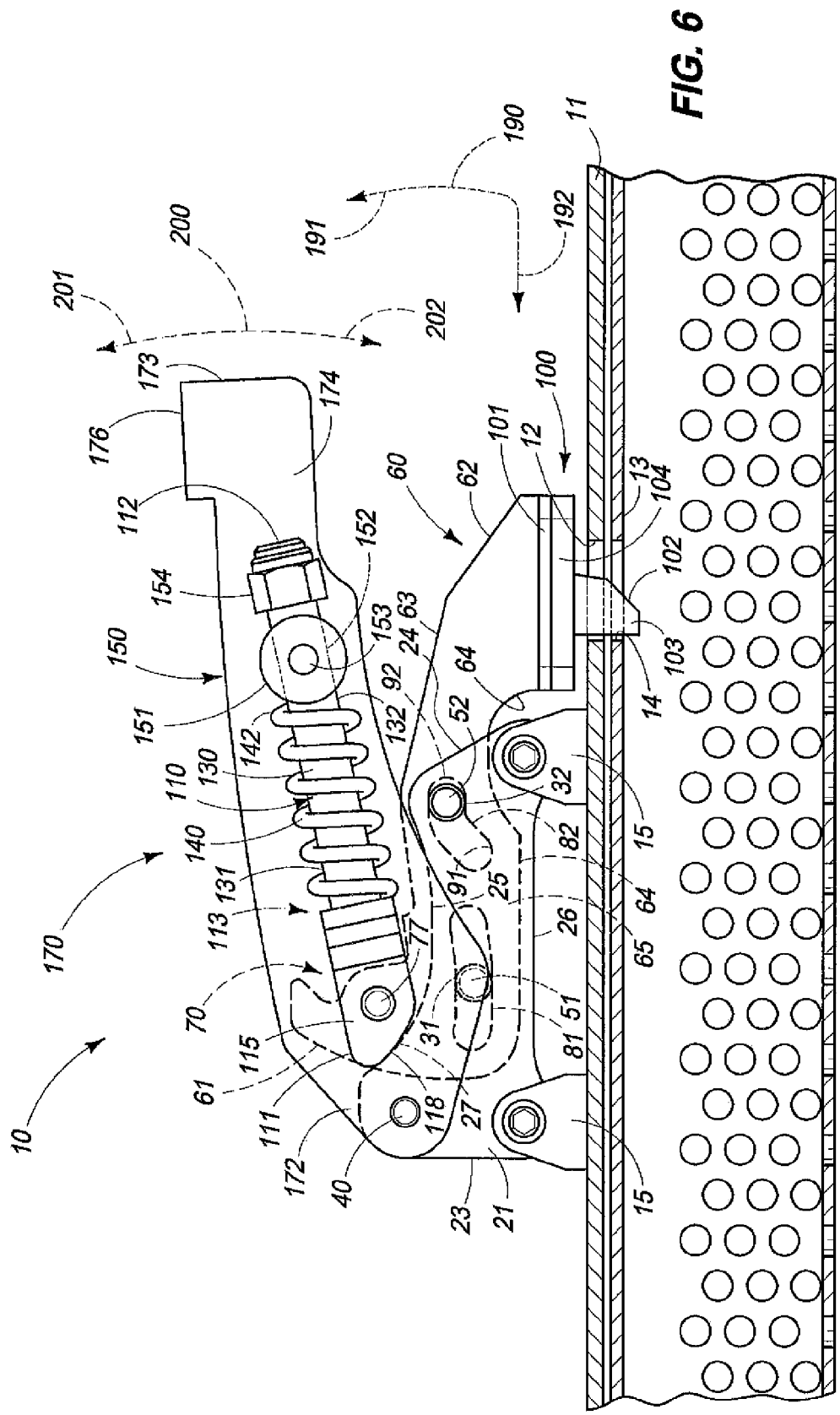
FIG. 6 is a vertical, sectional view of the clamp of the present invention, and showing the object engagement member in a closed position, and engaging an object of interest.

The present invention relates to a clamp which is generally indicated by the numeral 10 in FIG. 1 and following. The clamp 10 is shown in a very generalized operational environment in FIG. 6 and following. In this regard, the clamp is secured to an adjacent supporting surface which is generally indicated by the numeral 11. The adjacent supporting surface can be a sidewall, for example, of a vibratory conveyor bed or similar assembly (not shown). As illustrated in FIG. 6 and following, the adjacent supporting surface 11 has an aperture 12 formed therein. Still further, an object of interest 13, here depicted as a foraminous screen, has a coaxially aligned aperture 14 which is formed therein. This object of interest needs to be temporarily secured relative to the adjacent supporting surface 11. The adjacent supporting surface 11 has affixed thereto a pair of mounting tabs which are here indicated by the numeral 15. The mounting tabs are affixed by conventional means such as welding or the like. The mounting tabs or members 15 provide a convenient means whereby the clamp 10 may be secured on the adjacent supporting surface 11.

Referring now to FIG. 1, the clamp 10 includes a main body which is generally indicated by the numeral 20. The main body 20 has first and second, spaced and substantially parallel side plates which are here indicated by the numerals 21 and 22, respectively. The first and second side plates are of identical design and have a first end 23, and an opposite second end 24. Still further, each of the first and second side plates 21 and 22, respectively, have an uppermost or top peripheral edge 25, and a lowermost or bottom peripheral edge 26. Further, each of the first and second side plates have formed therein, a pair of mounting apertures 30 which are located at the opposite first and second ends 23 and 24, and near the lowermost bottom peripheral edge 26. The pair of mounting apertures 30 are formed so as to coaxially align, or otherwise be appropriately positioned, so as to be fastened to the respective aforementioned mounting tabs 15 which are affixed to the adjacent supporting surface 11, by using conventional fasteners. Additionally, and formed in the first and second side plates 21 and 22, is a first and second fixed pin aperture 31 and 32, respectively, and which will matingly cooperate with individual first and second fixed pins which will be described in the paragraphs, below. Again, the first and second fixed pin apertures 31 and 32 are formed in substantially identical locations in each of the first and second side plates 21 and 22, respectively. Still further, and formed in the first end 23 of each of the first and second side plates is a shoulder fastener aperture 33 which will cooperate with a shoulder fastener 40, and which extends therethrough, and which couples the first and second side plates 21 and 22 together in substantially parallel, spaced relation. The shoulder fastener 40 has a main body 41 which is located between the first and second side plates 21 and 22, and upon which a handle, as will be described in greater detail hereinafter, pivots or partially rotates. The shoulder fastener 40 has a distal end 42 which is releasably engaged by a threaded nut, and a washer 45. The nut and washer 45 secure the shoulder fastener 40 within the shoulder fastener apertures 33 as defined by the first and second side plates 21 and 22, respectively.

As best seen in the exploded, perspective view of FIG. 1, the clamp 10 includes a first and second fixed pin 51 and 52, and which are individually operable to be received in the respective first and second fixed pin apertures 31 and 32, respectively, and which are defined by the first and second side plates 21 and 22, respectively. As such, the first and second fixed pins are disposed in a substantially perpendicular relationship relative to the first and second side plates 21 and 22, and further extend therebetween the first and second side plates 21 and 22, and thereby orient said pins in substantially parallel, spaced relation to one another. Each of the respective first and second fixed pins have reduced dimensioned ends 53 which are operable to be received within the respective first and second fixed pin apertures 31 and 32 in the nature of a friction-fit. Additionally, each of the first and second fixed pins 51 and 52 have an intermediate body portion 54. The first and second fixed pins 51 and 52 are received, and will otherwise cooperate with first and second movement defining passageways as will be described, hereinafter, and which are formed in a movable object engagement member as will be disclosed.

The clamp 10 of the present invention includes a movable object engagement member which is generally indicated by the numeral 60. Referring now to the exploded, perspective view as seen in FIG. 1, and the view as provided in FIG. 5, the movable object engagement member 60 has a first end 61, and an opposite second end 62. Still further, the movable object engagement member 60 has a top peripheral edge 63, and an opposite bottom peripheral edge 64. Still further, the movable object engagement member 60 has an intermediate region 65. As further seen in FIG. 1, the movable object engagement member 60 includes, or further defines a clevis engaging region which is generally indicated by the numeral 70. The clevis engaging region is defined, in part, by a curved peripheral edge 71 which has opposite first and second ends 72 and 73, respectively. In this regard, the clevis engaging region generally has a first movement limiting seat 74 which is located at the first end 72, and a second movement limiting seat 75 which is formed at the second end of the curved peripheral edge 71. The operation of the first and second movement limiting seats 74 and 75 will be discussed in greater detail during the operation phase of the present application. As best seen in FIG. 1, it will be recognized that a clevis pivot pin aperture 76 is formed in the first end 61, and is operable to receive and cooperate with a clevis pivot pin 77 which is received therethrough. The clevis pivot pin functions as a pivot axes for an elongated movable clevis assembly. This feature will be discussed in greater detail in the paragraphs that follow.

Figure 5:
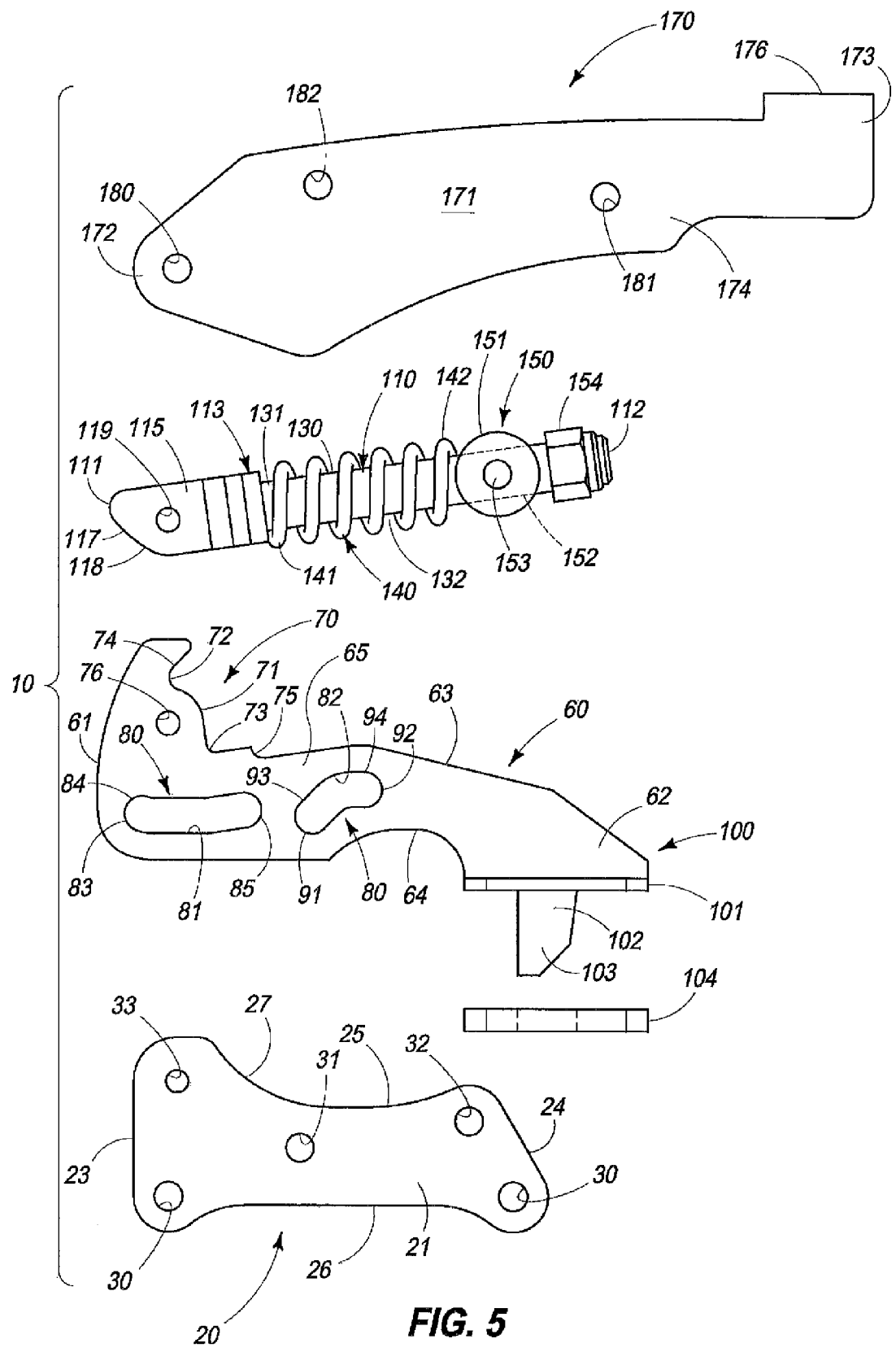
FIG. 5 is a partially, exploded, side elevation view of the component portions or parts of the clamp of the present invention.

Still referring to FIGS. 1 and 5, it will be recognized that the movable object engagement member 60 has formed therein a pair of movement defining passageways 80, in the intermediate region 65, thereof. The pair of movement defining passageways 80, working in combination with the first and second fixed pins 51 and 52, define a predetermined course of travel for the movable object engagement member 60 as will be described in greater detail, below. The pair of movement defining passageways 80 include a first movement defining passageway 81, and a second movement defining passageway 82. The respective movement defining passageways are disposed in predetermined spaced relationship one relative to the other, and further have predetermined shapes. In this regard, the first movement defining passageway 81 has a first end 83 which defines, at least in part, a fixed pin seat 84 within which the first fixed pin 51 may rest during the operation of the movable object engagement member 60, as will be described (FIG. 5). Still further, the first movement defining passageway 81 has a second end 85. The first movement defining passageway receives the first fixed pin 51 therethrough. During operation of the movable object engagement member 60, the first fixed pin 51 is movable between the first and second ends 83 and 85, respectively.

The second movement defining passageway 82 has a generally dog-legged shape (FIG. 5) and further has a first end 91, and a second end 92. Still further, the second movement defining passageway 82 is defined, in part, by a first course 93, and a second course 94 which is coupled with the first course 93. The shape of the second movement defining passageway 82 defines, in part, the course of travel of the movable object engagement member 60, as will be described, below. Again, the second fixed pin 52 is received through the second movement defining passageway 82, and is further movable between the first and second ends 91 and 92, as will be described in greater detail, below. Additionally, as will be seen in FIG. 1, the second end 62 of the movable object engagement member 60 includes a work object engagement member which is generally indicated by the numeral 100. The work object engagement member 100 as illustrated in FIG. 1 includes a support plate 101 which is affixed to the bottom peripheral edge 64 of the second end 62, and further a claw 102 extends substantially normally, downwardly therefrom. The claw has a distal end 103 which is operable to be received through the aperture 12 which is formed in the adjacent supporting surface 11. As seen in FIG. 1, a resilient seal 104 is configured to be received, on and about, the claw 102. The resilient seal 104 is operable to prevent any fluid or particulate matter from passing through the aperture 12 which is formed in the adjacent supporting surface 11.

An elongated movable clevis assembly is generally indicated by the numeral 110, and which is further pivotally or otherwise partially rotatably mounted on the first end 61 of the movable object engagement member 60. The elongated movable clevis 110 has a first end 111, and an opposite second end 112. Still further, the elongated movement clevis assembly 110 includes a clevis engagement member which is generally indicated by the numeral 113. The clevis engagement member 113 has a base portion 114, and a pair of spaced first and second depending arms 115 and 116, respectively, and which are spaced at a predetermined distance, apart, so that the respective first and second arms 115 and 116 are received or otherwise oriented on the opposite sides of the movable object engagement member 60. The respective first and second arms 115 and 116, respectively, each have a distal end 117. Still further, the distal end 117 defines a curved camming surface 118 (FIG. 5) which, when assembled, lies in forcible, camming engaging contact with the curved camming surface 27 which is defined by the uppermost peripheral edge 25 of the first and second side plates 21 and 22, respectively. Still further, coaxially aligned apertures 119 are formed in each of the first and second arms 115 and 116, respectively. The respective apertures 119 are operable to receive therethrough the clevis pivot pin 77 thereby rendering the elongated movable clevis assembly 110 partially rotatable or pivotable about the clevis engaging region 70 that was previously described. As will be recognized from a study of FIG. 1 and following, the engagement of the base portion 114 with either of the first movement limiting seat 74 or the second movement limiting seat 75 defines a predetermined course of travel for the elongated movable clevis assembly 110. This operational feature will be discussed in greater detail, hereinafter.

The elongated movable clevis assembly 110 further comprises an elongated lever portion 130, having a proximal end 131, and which is suitably affixed to the base portion 114, as earlier described. The elongated lever portion has a generally cylindrically shaped intermediate portion 132. As seen in FIG. 1 and following, the second end 112 of the elongated movable clevis assembly 110, in the form of the invention as illustrated, is threaded so as to be operable to be releasably engaged by a threaded nut or other engagement member as will be described, below. Still further, a biasing member, here shown as a coil spring, is operable to be received on, and about, the cylindrically shaped intermediate portion 132 of the elongated lever portion 130. The biasing member 140 is received between the first end 111, and more specifically the base portion 114 of the elongated movement clevis assembly 110, and a lever portion receiving member as will be described in the paragraphs, below. The biasing member has a first end 141 which rests in contact with the base portion 114, and a second end 142 which lies in contact with the lever portion receiving member as will be discussed hereinafter.

The present invention includes, as noted above, a lever portion receiving member, and which is generally indicated by the numeral 150 (FIGS. 1 and 5). The lever portion receiving member 150 has a generally cylindrically shaped main body 151. The main body 151 has opposite ends and further defines a passageway 152 which is generally cylindrically shaped, and which further extends therethrough, and which additionally has a cross-sectional dimension which allows the second end 112 of the elongated movable clevis assembly 110 to pass therethrough, and be slideably movable therewith. The main body 151 has opposite ends, and individual axle pin members 153 extend outwardly from the opposite ends, and are operable to rotatably mate with a handle which will be discussed in greater detail, below. In the arrangement as seen in the drawings, a threaded nut 154 is provided and which is operable to matingly engage the second end 112 of the elongated movable clevis assembly 110. When assembled, the threaded nut 154 prohibits, or otherwise impedes the movement or the removal of the second end 112 from the main body 151. However, the present arrangement also allows the elongated lever portion 130 to move longitudinally relative to the main body 151, and against the biasing force of the biasing member 140 in a manner which will be discussed in greater detail, below.

The clamp 10, as seen in the drawings, includes a movable handle 170 upon which force may be applied by a user (not shown), to move the handle along a given a course of travel, as will be described hereinafter, in order to affect the subsequent movement of the movable object engagement member 60 between an open and closed position, as will be described. The handle 170 has a main body 171 which has a proximal end 172, and which is pivotably affixed to the first end 23 of each of the respective first and second side plates 21 and 22, by way of the shoulder fastener 40. Still further, the handle has a second, opposite, or distal end 173, upon which force may be applied by a user (not shown), in order to cause the movement of the handle 170. The main body 171 is formed of spaced, elongated first and second side arms 174 and 175, respectively. The first and second side arms are disposed in predetermined, spaced relation, and further define a space therebetween, which allow the first and second side plates 21 and 22, respectively, to be received therebetween. Still further, a transversely disposed coupling plate 176 is located at the distal end 173, and further extends between the first and second side arms 174 and 175, respectively, so as to provide a convenient surface upon which force may be applied, either downwardly or upwardly, so as to move the handle 170 along the course of travel as will be described, hereinafter, in order to achieve the benefits of the present invention.

As should be understood by a study of FIG. 1 and following, a handle 170, and more specifically the first and second side arms thereof have apertures 180 to receive the shoulder fastener 40, and which are formed in the first or proximal end 172. The respective shoulder fastener receiving apertures 180 are coaxially aligned, and are further operable to receive the main body 41 of the shoulder fastener 40 and which is operable to engage the first end 23 of each of the respective side plates 21 and 22, respectively. Still further, an axle pin member receiving aperture 181 is formed in each of the first and second side arms 174, and are individually sized so as to matingly receive the axle pin members 153 which extend longitudinally outwardly relative to the main body 151 of the lever portion receiving member 150. As earlier described, the lever portion receiving member is operable to slideably and matingly receive, and cooperate with, the second end 112 of the elongated movable clevis assembly 110. Still further, there is formed in the respective first and second side arms 174 and 175, respectively, a release or locking pin passageway 182. The release or locking pin passageway 182 is sized so as to receive a locking or release pin 183 therein. The release or locking pin 183, in one form of the invention, allows the handle 170 to be locked into a position so as to prevent the movement of the elongated movable clevis assembly 110. This feature of the invention will be discussed in greater detail in the paragraphs which follow.

Figure 7:
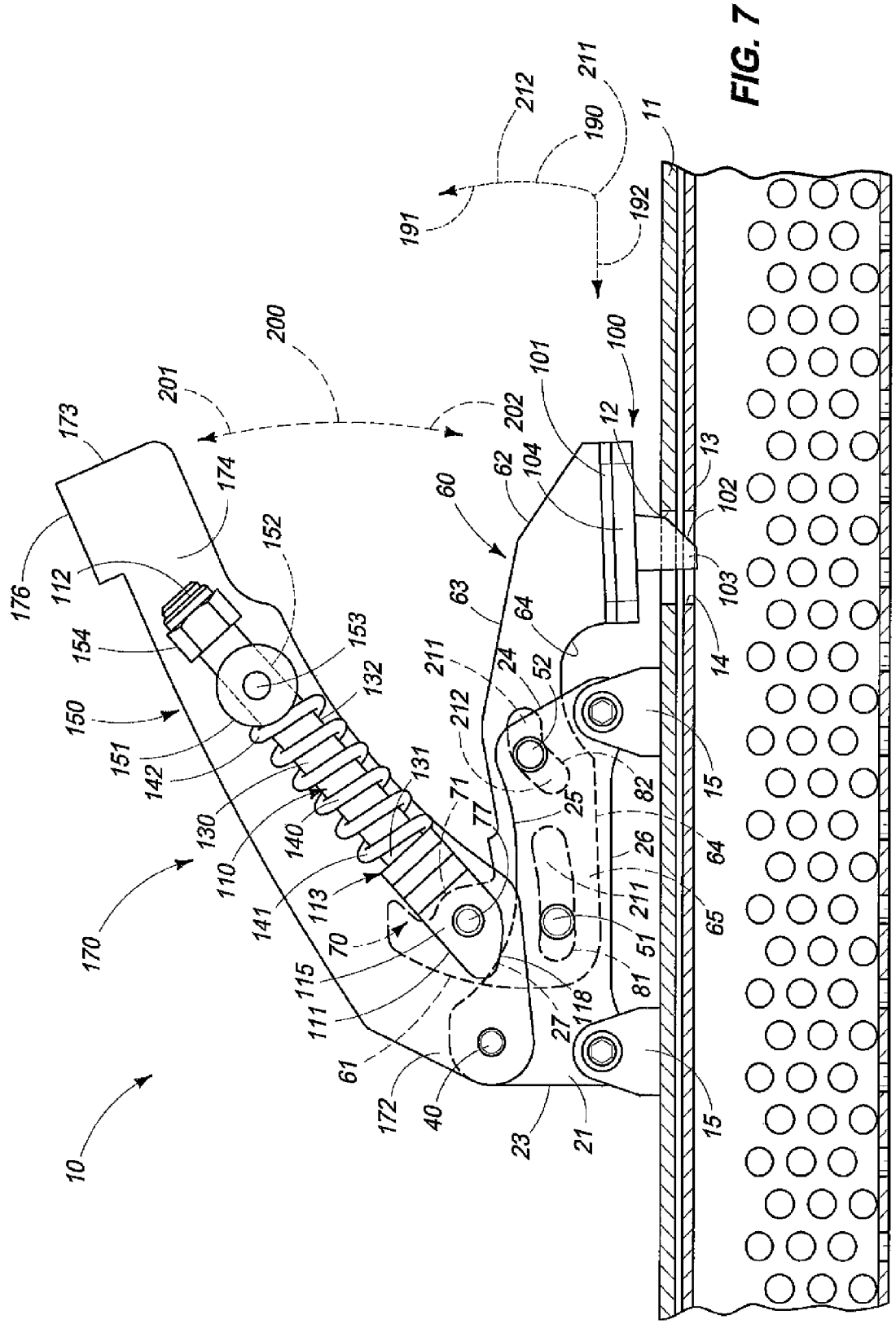
FIG. 7 is a second, vertical, sectional view of the clamp of the present invention in an intermediate position, and where the object engagement member thereof is moving from a closed position towards an open position.
Figure 8:
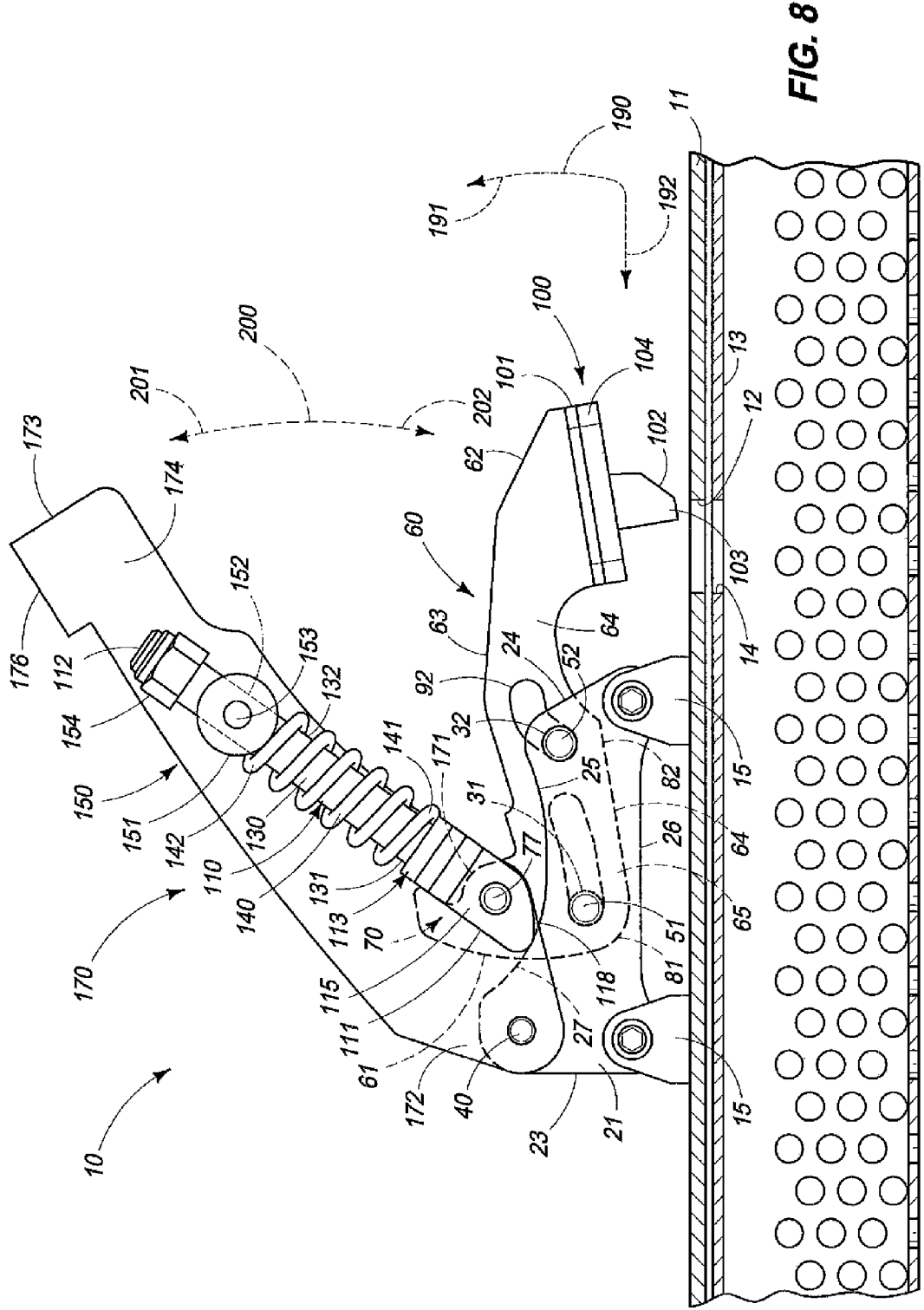
FIG. 8 is another vertical, sectional view of the clamp of the present invention, and wherein the object engagement member thereof is located in an open position.
Figure 9:
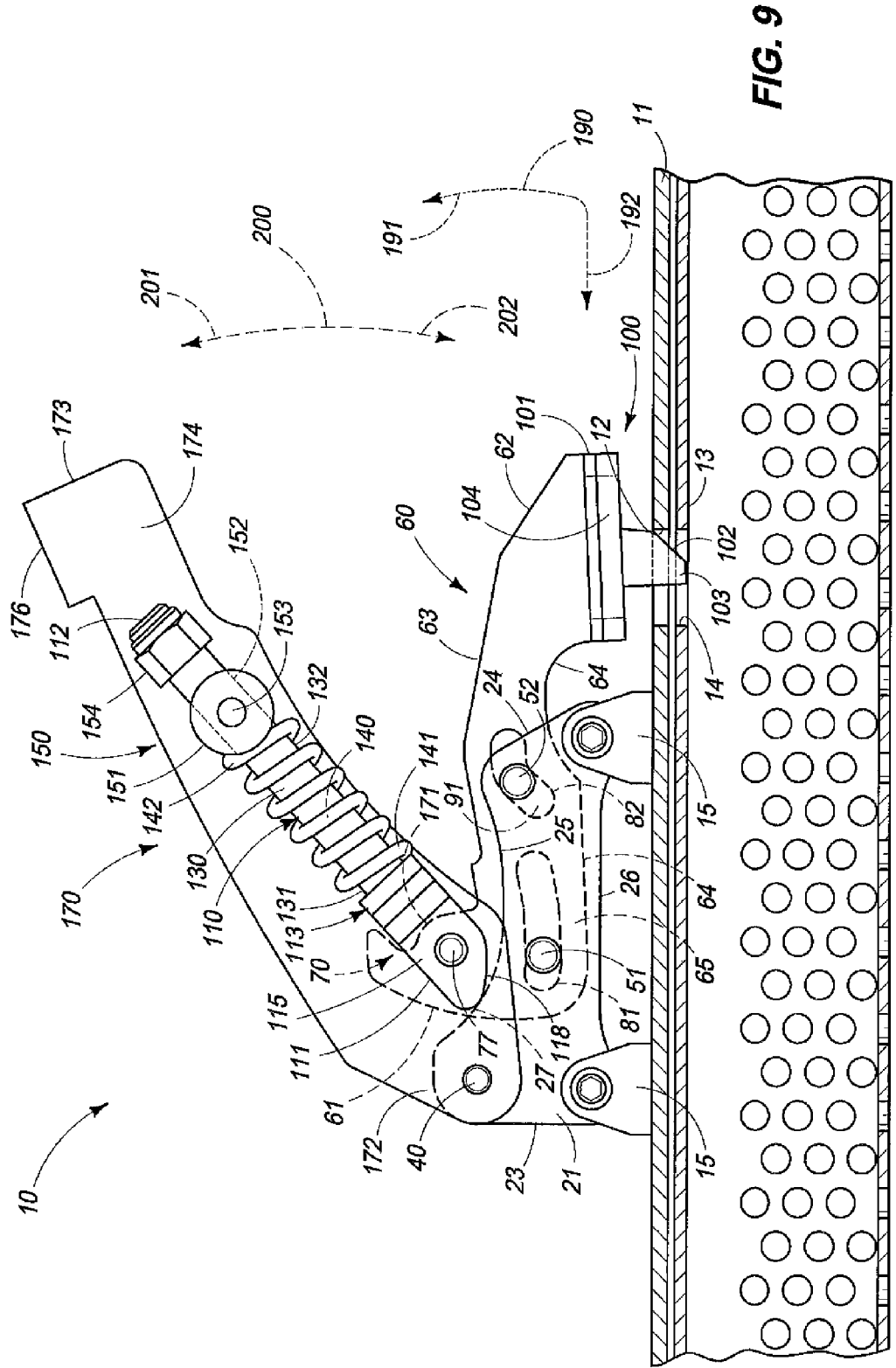
FIG. 9 again shows still another vertical, sectional view of the clamp of the present invention shown in an intermediate position, and moving from the open position as seen in FIG. 8 towards a closed position.
Figure 10:
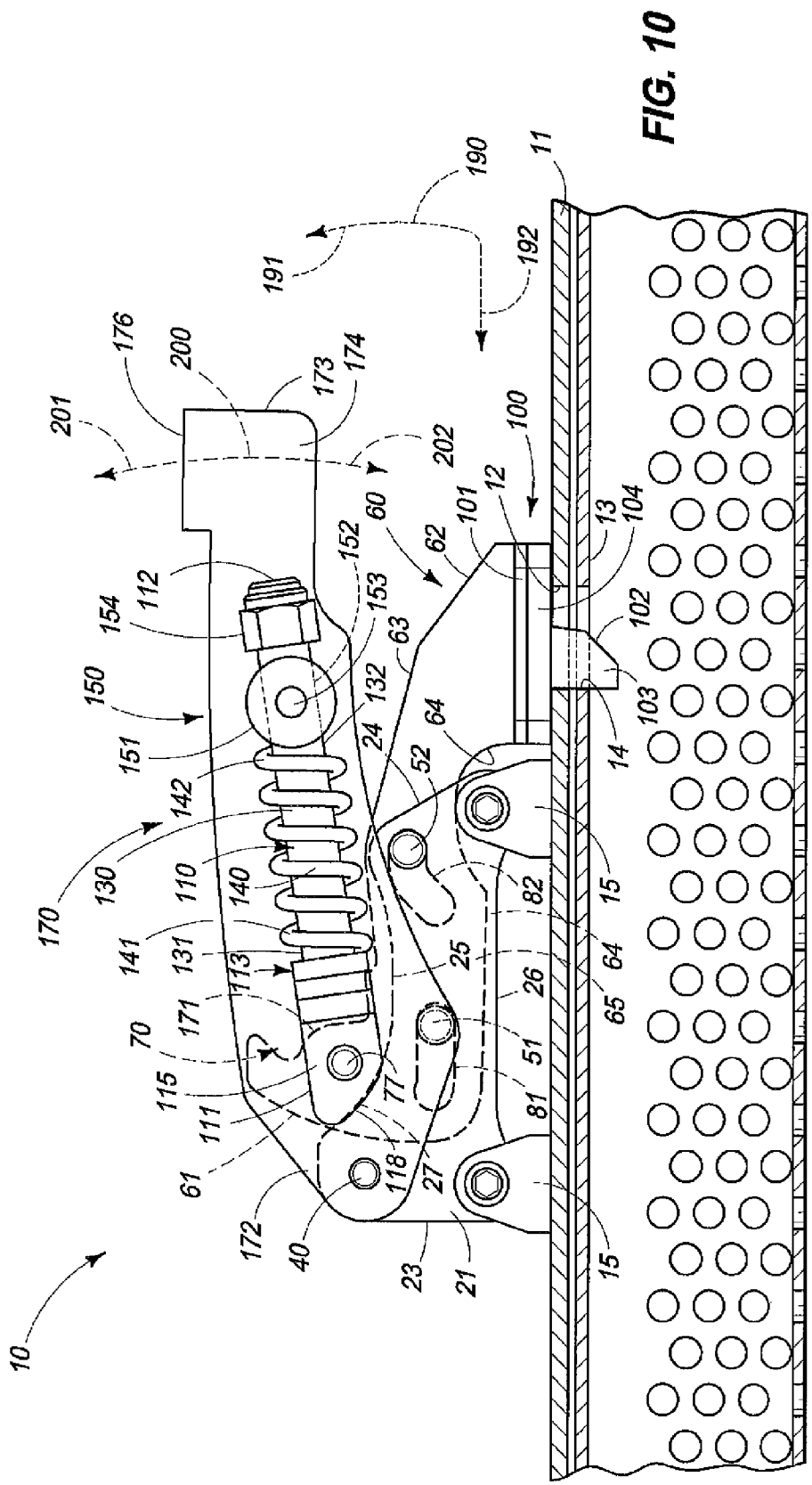
FIG. 10 shows still another vertical, sectional view of the clamp of the present invention in a closed position, and fully engaging an object of interest.

The clamp 10 as described has structural features which move along several paths of travel in order to achieve the desired clamping effect. More specifically, and as best appreciated by a study of FIG. 6-10, the movable object engagement member 60 is borne by, and is further partially rotatable, and longitudinally movable relative to the opposite side plates 21 and 22, respectively. The movable object engagement member 60 is further movable along a predetermined path of travel or movement 190 between a first open position 191, and a second closed position 192. Still further, a movable force application assembly which includes the elongated clevis assembly 110, and the handle 170, working in combination, is movable along a course of travel 200 between a first open or up position 201, and a second, down or closed position which is generally indicated by the numeral 202. Additionally, it will be understood from a study of the drawings, that the path of movement 190 between the opened and closed positions 191 and 192, respectively has a first movement component 211 (FIG. 7) that reciprocally carries the movable object engagement member 60 along a given generally linearly disclosed path of travel; and a second movement component 212, which reciprocally carries the movable object engagement member 60, at least in part, perpendicularly or laterally outwardly relative to the generally linear path of travel of the first movement component 211. The movement of the object engagement member 60 along the path of travel 190 is effective in causing the respective first and second fixed pins 51 and 52, respectively, to be located between the first and second ends 83 and 85, and 91 and 92 of the first and second movement defining passageways 81 and 82, respectively. During the movement of the handle 170 along the course of travel 200, the elongated movable clevis assembly 110, and more specifically, the first end 111 thereof, cammingly engages the curved camming surface 27 as defined by the first and second side plates 21 and 22. As force is applied on the distal end 173 of the handle 170, compression is applied to the biasing member 140, and the second distal end 112 moves longitudinally relative to the lever portion receiving member 150. As earlier discussed, the first and second movement limiting seats 74 and 75, respectively, are operable to engage the base portion 114 of the clevis engagement member 113 so as to prohibit further rotation of the movable force application assembly 200, and thereby defines the path of travel 190. The movable object engagement member 60 includes a work object engagement member 100 which in the embodiment as seen includes a claw 102, and which is operable to cooperate and engage an object of interest 13 thereby securing it during a manufacturing operation.

Operation

The operation of the described embodiment of the present invention is believed to be readily apparent and is briefly summarized at this point.

Figure 2:
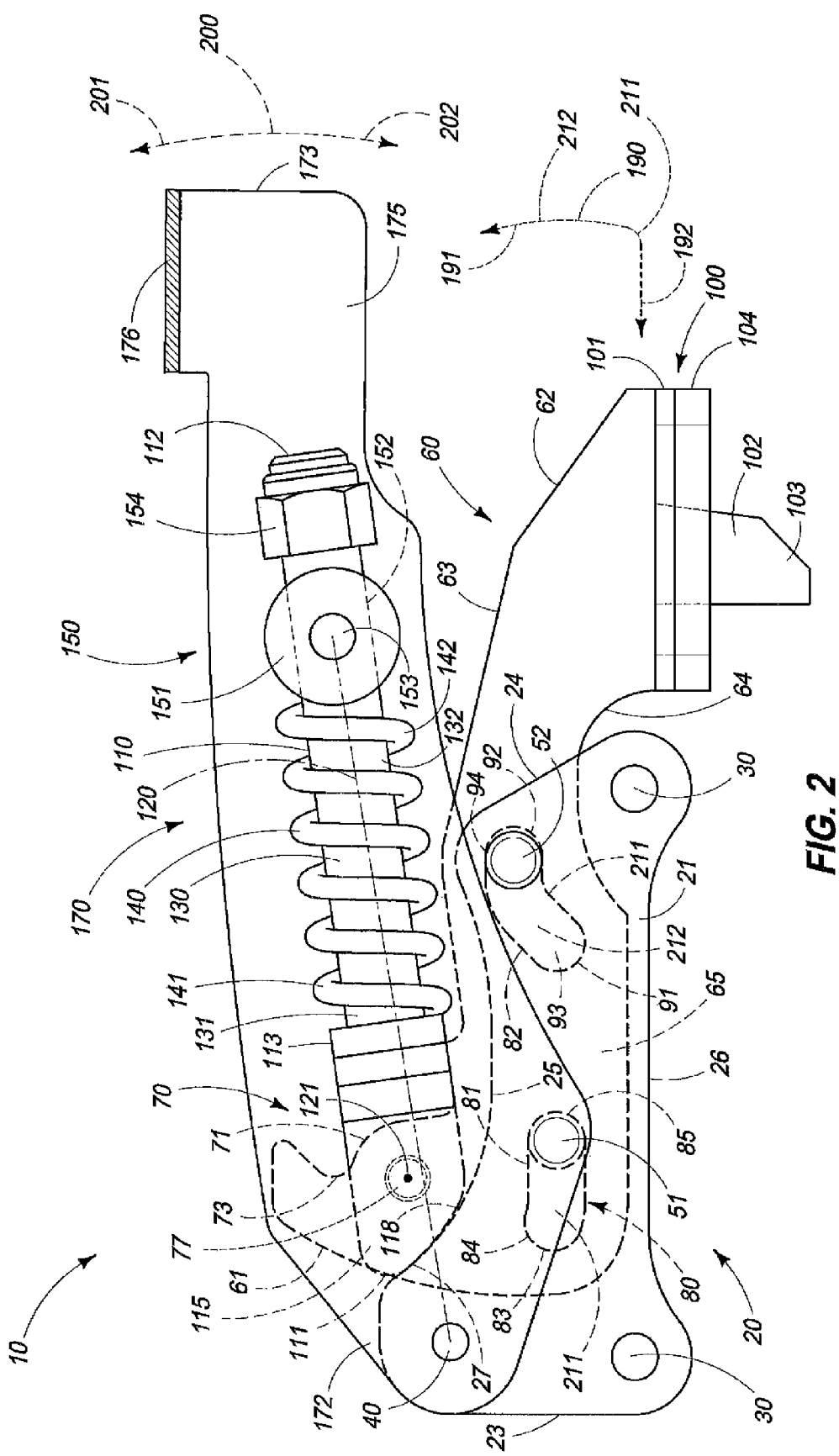
FIG. 2 is a side elevation view of the clamp of the present invention, and which illustrates some underlying surfaces in phantom lines.
Figure 3:
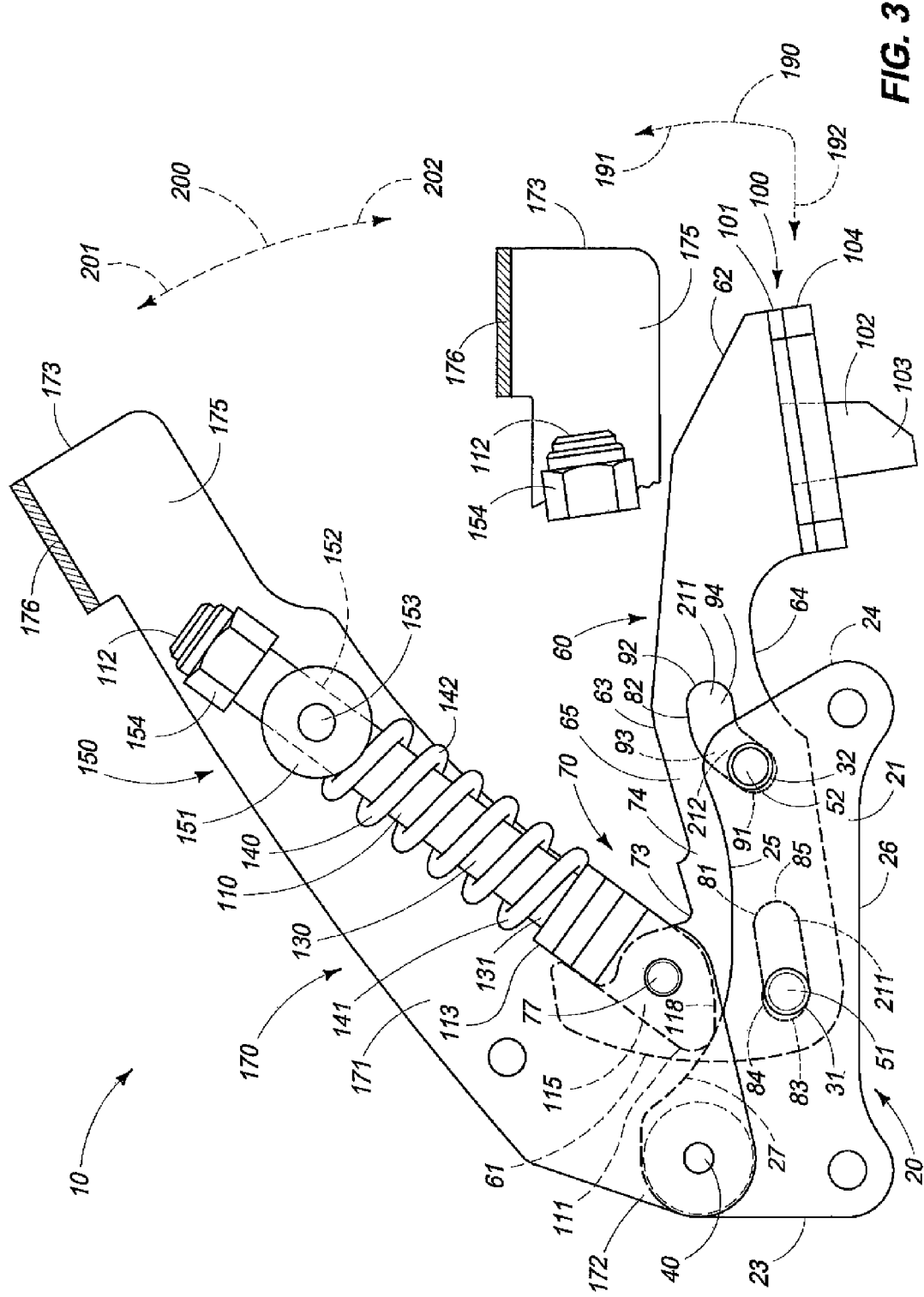
FIG. 3 is a longitudinal, vertical sectional view of the clamp, and which is taken through a handle thereof.
Figure 4:
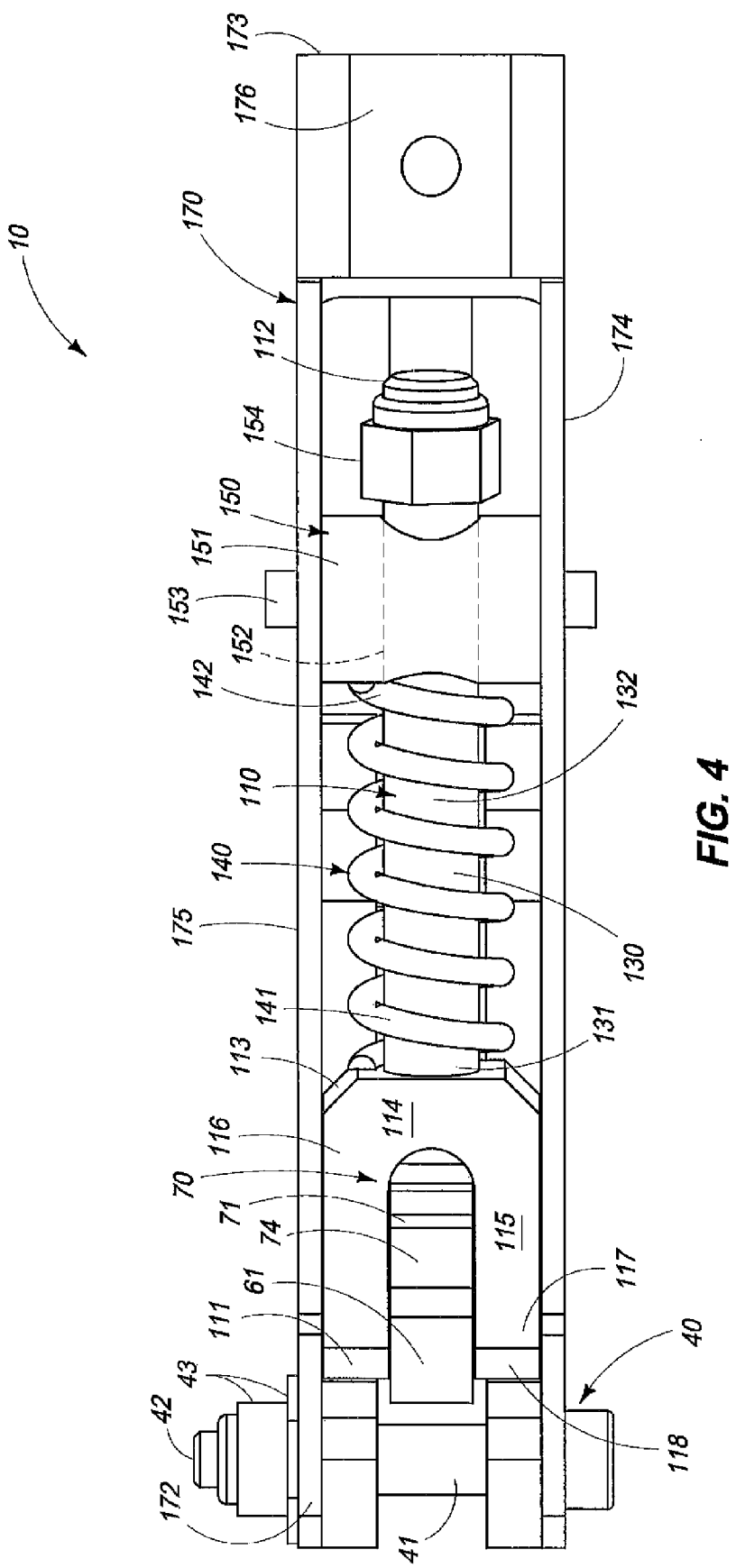
FIG. 4 is a top plan, horizontal sectional view of the clamp of the present invention.

A first aspect of the present invention relates to a clamp 10 which includes a main body 20, and which is defined, in part, by spaced, side plates 21 and 22, respectively, and wherein the main body 20 is secured to an adjacent supporting surface 11. As seen in FIG. 2 and following, the clamp 10 includes a moveable object engagement member 60 which is borne by, and is further partially rotatable, and longitudinally moveable relative to, the opposite side plates 21 and 22, and along a predetermined path of movement 190 between an opened and closed position 191 and 192, respectively. The clamp 10 further includes a moveable force application assembly which is formed of the component portions 110 and 170, respectively, and which further pivotally cooperates with the opposite side plates 21 and 22, and is further disposed in force transmitting relation relative to the moveable object engagement member 60. The movable force application assembly when moved along a given course of travel 200, applies force to the moveable object engagement member 60 so as to urge the moveable object engagement member 60 along the predetermined path of travel 190 between the opened and closed positions 191 and 192, respectively. The clamp 10 is particularly novel because of the respective paths of travel noted, above. More specifically, the path of movement 190 between the open and closed positions 191 and 192, respectively, has a first movement component 211, that reciprocally carries the moveable object engagement member 60 along a given, generally linearly disposed path of travel; and a second movement component 212 which reciprocally carries the moveable object engagement member 60, at least in part, perpendicularly, or laterally outwardly relative to the generally linearly disposed path of travel which is defined by the first movement component 211. In the arrangement as seen in the drawings, the clamp 10 further includes a shoulder fastener or other axle member 40 which is secured to each of the spaced opposite side plates 21 and 22, respectively, and wherein the movable force application assembly further comprises, at least in part, a handle 170 which is pivotally mounted on, and is movable relative to a shoulder fastener 40. The pivotal movement of the handle effects the movement of the moveable object engagement member between the opened and closed positions 191 and 192, respectively.

The clamp 10, and more specifically, the moveable object engagement member 60 has opposite first and second ends 61 and 62; top and bottom peripheral edges 63 and 64, respectively; and an intermediate region 65 is located between the first and second ends 61 and 62, respectively. The top, peripheral edge 63 of the moveable object engagement member 60, in the area which is adjacent to the first end 61, further defines a clevis engaging region 70 which matingly cooperates with, and is disposed in force receiving relation relative to the handle 170. A work object engagement member 100, and which is depicted as a claw 102, is made integral with the second end 62 of the moveable object engagement member 60, and is further located on the bottom peripheral edge 64 thereof. A first and second movement defining passageway, 81 and 82, are individually formed in the intermediate region 65 of the moveable object engagement member 60. Further, each of the first and second movement defining passageways 81 and 82 define, in part, the first and second movement components 211 and 212 of the path of movement 190 of the moveable object engagement member 60. In the arrangement as seen in the drawings, the clamp 10 further includes a pair of fixed pin members 51 and 52, and which matingly engage each of the side plates 21 and 22, respectively, of the main body 20, and which further, are individually received through and cooperate with the respective first and second movement defining passageways 81 and 82 which are formed in the intermediate region 65 of the moveable object engagement member 60. The cooperative and mating receipt of the pair of fixed pin members 51 and 52 within the first and second movement defining passageways 81 and 82, respectively, defines the predetermined path of travel 190 of the moveable claw member 100 between the opened and closed positions 191 and 192, respectively.

The clamp 10, as earlier noted, includes a moveable force application assembly which is formed of the component portions 110 and 170, respectively. In this regard, and as earlier noted, the movable force application assembly includes a moveable clevis assembly 110 which has a first end 111, and which further includes a clevis engagement member 113. The clevis engagement member is further pivotally affixed to the first end 61 of the moveable object engagement member 60, and is further located adjacent to the clevis engaging region 70 thereof. Additionally, it will be noted that the movable clevis assembly 110 includes a second, elongated lever portion 130 which is affixed to the clevis engagement member 113, and which further defines a second, distal end 112 of the moveable clevis assembly 110. The clevis engagement member 113 has opposite, substantially spaced arms 115 and 116, respectively, and a base portion 114 which extends between the substantially spaced arms 115 and 116, respectively. As illustrated in the drawings, the spaced arms 115/116 each have a distal end 117 which defines a curved camming surface 118. The respective arms 115/116 of the clevis engagement member 113 forcibly engage, and individually, moveably cooperate with a complimentary camming region 27 which is defined, in part, by each of the side plates 21/22, as the handle 170 moves along the course of travel 200 which is defined by the moveable force application assembly to effect the movement of the moveable object engagement member 60 between the open and closed positions 191 and 192, respectively.

As earlier disclosed, the clamp 10 includes a handle 170 which has a proximal end 172, and which further is pivotally mounted on, and about, the shoulder fastener 40, and further has an opposite, distal end 173 upon which force is applied by a user, so as to effect the movement of the moveable object engagement member 60 along the predetermined path of movement 190, and between the open and closed positions 191 and 192, respectively. The handle 170 further includes a lever portion receiving member 150 which pivotally and movably receives, and matingly, and slideably cooperates with the second, distal end 112 of the movable clevis assembly 110. The second, distal end 112 of the moveable clevis assembly 110 is received, and passes through the lever portion receiving member 150. As should be understood, a restraining member 154 engages the second, distal end 112 of the moveable clevis assembly 110 so as to prohibit the removal of the second end 112 from the lever portion receiving member 150. Additionally, a biasing member 140, here depicted as a coil spring is located between the clevis engagement member 113, and the lever portion receiving member 150, and wherein the subsequent movement of the handle 170 along the given course of travel of the moveable force application assembly, 200, causes the biasing member 140 to be placed, alternatively, into compression, as the moveable object engagement member 60 moves between the open and closed positions 191 and 192, respectively. As will be recognized, the biasing assembly 140 is here depicted as a coil spring. However, it will be recognized that other biasing assemblies may be used in place of the depicted coil spring. Such biasing assemblies may include other resilient members having a solid body or further may include different biasing members having different forces to compress same. Additionally, the biasing assembly may include other assemblies such as pneumatic cylinders; fluidic muscles and the like, and which may render differing amounts of biasing force in order to effect the features of the present invention.

As disclosed earlier in this patent application, the clamp 10 includes a clevis engaging region 70 which has a curved peripheral edge 71, and opposite first and second ends 72 and 73, respectively. The base portion 114 of the moveable clevis engagement member 113 is located in juxtaposed, spaced relation relative to the curved peripheral surface 71 of the clevis engaging region 70 as it moves. As further understood by a study of the drawings, upon movement of the handle 170 along the given course of travel 200, the second, distal end 112 of the moveable clevis assembly 110 moves longitudinally, and slideably through the lever portion receiving member 150, which is mounted on the handle 170, and further, simultaneously forcibly cooperates with the biasing member 140 to place the biasing member 140 into compression. The distal end 117 of the respective arms 115 and 116, respectively, of the clevis engagement member 113 forcibly, and cammingly engage the complimentary camming region 27 which is defined by the spaced side plates 21 and 22, respectively. This forcible engagement is effective to move the movable object engagement member 60 along the aforementioned course of travel 190.

The clamp 10, as described, includes respective first and second movement defining passageways 81 and 82, and wherein each of these movement defining passageways have respective first and second ends 83; 85; 91 and 92, respectively. The respective fixed pin members 51/52, as earlier described, are individually located at the first end 83/91 of each of the first and second movement defining passageways 81/82 when the moveable clevis assembly 110, which moveably cooperates with the handle 170, is located at the first end 72 of the curved peripheral edge 71 of the clevis engaging region 70, and the moveable object engaging member 60 is located in the opened position 191. The respective pin members 51/52 are further located at the second end 85 and 92, respectively, of each of the respective first and second movement defining passageways 81/82 when the moveable clevis assembly 110 is located at the second end 73 of the curved peripheral edge 71 of the clevis engaging region 70, and the moveable object engaging member 60 is located in the closed position 192. As will be recognized from a study of the drawings, the biasing member 140 exerts a biasing force on the elongated movable clevis assembly 110 throughout its path of travel 200, and between the first and second ends 72 and 73 of the curved peripheral edge 71. Still further, the biasing member 140 biasingly retains and prevents the movement of the handle 170 when located in engagement with the first and second movement limiting seats 74 and 75, respectively. The predetermined path of movement 190 of the movable object engagement member 60 between the open and closed position 191 and 192 causes the second end 62 of the movable object engagement member 60 to travel along the second movement component 212 (FIG. 7) downwardly, and along an arcuately shaped path of travel; and then travel along the first movement component 211 inwardly, and along a substantially linear path of travel, and in the direction of the main body 20 of the clamp 10. This movement is unique relative to known prior art clamps.

As earlier noted, the clamp 10 includes a moveable clevis assembly 110 which has a rotational axis 121 (FIG. 2) relative to the moveable object engaging member 60, and further has a longitudinal line of reference 120 which is seen in FIG. 2 and which extends along a longitudinal axis of the moveable clevis assembly 110, and then passes through the shoulder fastener 40. The shoulder fastener 40 pivotally secures the handle 170 to the respective side plates 21 and 22, respectively. As seen in FIG. 2, the rotational axis 121 of the moveable clevis assembly 110 is located over the center of the longitudinal line of reference 124 when the moveable object engagement member 160 is located in the closed position 192. The biasing member 140, again, biasingly restrains the handle 170 when the handle 170 locates the moveable object engaging member 60 in either the open or closed positions 191 and 192, respectively.

As will be seen in the drawings, the clevis engaging region 70 has a first end 72, defining a first, movement limiting seat 74, and which matingly engages the clevis engagement member 113, and which further, restricts the motion of the moveable clevis assembly 110, and the handle 170 which cooperates with moveable clevis assembly 110 when the moveable object engagement member 60 is in the open position 191. The clevis engaging region 70 further has a second, movement limiting seat 75 which matingly engages the clevis engagement member 113, and which further restricts motion of the moveable clevis assembly 110 when the moveable object engagement member 60 is located in the closed position 192. As seen in the drawings, the first end 83 of the first movement defining passageway 81, and which is formed in the moveable object engaging member 60, defines a pin seat 84 which receives the fixed pin 51. The first movement defining passageway 81 defines, at least in part, a first portion of the first movement component 211 of the moveable object engagement member 60; and the second movement defining passageway 82 defines, at least in part, a second portion of the first movement component 211; and the second movement component 212 of the moveable object engagement member 60. As further illustrated in the drawings (FIG. 1), a passageway 182 is formed through the handle 170, and a release pin 183 is provided, which is further received in the passageway 182, and which releasably engages the clevis engaging region 70 of the moveable object engagement member 60 so as to prohibit motion of the object engagement member 60 between the open and closed positions 191 and 192, respectively.

More specifically, the clamp of the present invention 10 includes a main body 20 having spaced, substantially parallel, side plates 21 and 22, and which have a lowermost peripheral edge 26 and which is secured to an underlying surface 11. Still further, the main body 20 includes an uppermost peripheral edge 25 which defines, at least in part, a curved camming surface 27. The respective side plates 21 and 22 each have a first, and an opposite, second end 23 and 24, respectively. As seen in the drawings, a shoulder fastener 40 couples the first end 23 of each of the side plates 21 and 22 together. The present invention 10 further includes a first and a second fixed pin 51 and 52, respectively, and which individually extend between, and couple together the first and second side plates 21 and 22. The respective fixed pins 51 and 52 are each located in a substantially perpendicular orientation relative to each of the side plates 21 and 22, and are further disposed in a predetermined, parallel, spaced orientation, one relative to the other. The clamp 10 includes a handle 170 having a proximal end 172 which is pivotally affixed to the first end 23 of each of the side plates 21 and 22 by the shoulder fastener 40. The handle 170 further has an opposite second end 173. The handle 170 is reciprocally moveable along a given course of travel 200 between a first and a second position 201 and 202, respectively. The clamp 10 further includes a moveable object engagement member 60 having a first and a second end 61 and 62, and top and bottom peripheral edges 63 and 64, respectively. A first and a second movement defining passageway 81 and 82, respectively, are formed in, and extend through, the moveable object engagement member 60. The first fixed pin 51 is received through the first movement defining passageway 81; and the second fixed pin 52 is received through the second movement defining passageway 82. A clevis engaging region 70 is defined by the top peripheral edge 63, and is located near the first end 61 of the moveable object engagement member 60. The clamp 10 includes an elongated moveable clevis assembly 110 having a first end 111 which is pivotally mounted to the first end 61 of the moveable object engagement member 60. The moveable clevis assembly 110 further matingly cooperates with the clevis engaging region 70 thereof, and further has a distal end 112 which matingly and moveably cooperates with the second end 173 of the handle 170. The first end 111 of the moveable clevis assembly 110 cammingly engages the curved camming surface 27 which is defined by the uppermost peripheral edge 25 of each of the respective side plates 21 and 22, respectively. The clamp 10 further includes a biasing member 140 which is positioned between the first end 111 of the elongated moveable clevis assembly 110 and the handle 170. The biasing member biasingly retains the handle 170 in either the first or second position 201 or 202, respectively. The movement of the handle 170 between the first and second positions 201 and 202 is effective in urging the moveable object engagement member 60 along a predetermined path of travel 190 from an open position 191, to a closed position 192. As recognized from the drawings, in the closed position 192 the second end 62 of the moveable object engagement member 60 forcibly engages an object of interest 13.

Therefore it will be seen that the clamp 10, as illustrated, provides many advantages over the prior art clamps of substantially similar design. Further, the present clamp is biasingly retained in either the open or closed positions 191 and 192, respectively, so as to prohibit any adverse movement of the handle 170 if the clamp is deployed in environments where vibrational energy is being imparted to the clamp because of the manufacturing environment where it is utilized. The clamp 10 is easy to deploy, provides a large amount of clamping force to retain an object of interest 13, and further can be opened and closed with relatively a small amount of force because of the over-center construction as provided for in the design of the clamp.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A clamp, comprising:
    a main body defined in part by spaced, opposite side plates, and wherein the main body is secured to an adjacent supporting surface, and wherein a shoulder fastener is secured to each of the spaced, opposite side plates;
    a moveable object engagement member having a longitudinal axis, and which is further borne by, and partially rotatable, and longitudinally moveable relative to the opposite side plates, and along a predetermined path of movement between an opened and closed position, and wherein the path of movement between the opened and closed positions has a first movement component that reciprocally carries the moveable object engagement member along a given, generally linearly disposed path of travel, and a second movement component which reciprocally carries the moveable object engagement member, at least in part, perpendicularly, relative to the generally linearly disposed path of travel of the first movement component, and wherein the moveable object engagement member has opposite first and second ends; top and bottom peripheral edges; and an intermediate region located between the first and second ends, and wherein the top peripheral edge of the moveable object engagement member, in the area which is adjacent to the first end, further defines a clevis engaging region which matingly cooperates with, and is disposed in force receiving relation relative to a handle, and wherein a work object engagement member in the form of a claw, is made integral with the second end of the moveable object engagement member, and which is further located on the bottom peripheral edge thereof, and wherein first and second movement defining passageways are individually formed in the intermediate region of the moveable object engagement member, and further each of the first and second movement defining passageways define, in part, the first and second movement components of the path of movement of the moveable object engagement member; and
    a moveable force application assembly which comprises, at least in part, the handle and which further pivotally cooperates with the opposite side plates, and is further disposed in force transmitting relation relative to the moveable object engagement member, and which further, when moved along a given course of travel, applies force to the moveable object engagement member to urge the moveable member along the predetermined path of travel between the opened and closed position, and wherein the handle is pivotally mounted on, and moveable relative to the shoulder fastener, and wherein the pivotal movement of the handle effects the movement of the moveable object engagement member between the opened and closed positions.

2. The clamp as claimed in claim 1, and further comprising a pair of fixed pin members which matingly engage each of the side plates of the main body, and which further, are individually received through the respective first and second movement defining passageways which are formed in the intermediate region of the moveable object engagement member, and wherein the cooperative and mating receipt of the pair of fixed pin members within the first and second movement defining passageways defines the predetermined path of travel of the moveable claw member between the opened and closed positions.

3. The clamp as claimed in claim 2, and wherein the moveable force application assembly further comprises, in part, a moveable clevis assembly which has a first end, which includes a clevis engagement member and which is pivotally affixed to the first end of the moveable object engagement member, and which is further located adjacent to the clevis engaging region thereof, and a second, elongated lever portion which is affixed to the clevis engagement member, and which further defines a second, distal end of the moveable clevis assembly, and wherein the clevis engagement member has opposite, substantially spaced arms, and a base portion which extends between the opposite, substantially spaced arms, and wherein opposite, substantially spaced arms each have a distal end which defines a curved camming surface, and wherein the respective opposite, substantially spaced arms of the clevis engagement member forcibly engage, and individually moveably cooperate with a complimentary camming region which is defined, in part, by each of the side plates, as the handle moves along the given course of travel which is defined by the moveable force application assembly so as to effect the movement of the moveable object engagement member between the open and closed positions.

4. The clamp as claimed in claim 3, and wherein the handle has a proximal end which is pivotally mounted on the shoulder fastener, and an opposite, distal end upon which force is applied by a user, so as to effect the movement of the moveable object engagement member along the predetermined path of movement, and between the open and closed positions, and wherein the handle further comprises a lever portion receiving member which pivotally and movably receives, and matingly cooperates with the second, distal end of the movable clevis assembly, and wherein the second, distal end of the moveable clevis assembly is received, and passes through the lever portion receiving member, and wherein a restraining member engages the second, distal end of the moveable clevis assembly so as to prohibit the removal of the second end from the lever portion receiving member, and wherein a biasing member is located between the clevis engagement member and the lever portion receiving member, and wherein movement of the handle along the given course of travel of the moveable force application assembly causes the biasing member to be placed into compression as the moveable object engagement member moves between the open and closed positions.

5. The clamp as claimed in claim 4, and wherein the clevis engaging region has a curved peripheral edge, and opposite first and second ends, and wherein the base portion of the moveable clevis engagement member is located in juxtaposed, spaced relation relative to the curved peripheral surface of the clevis engaging region, and wherein upon movement of the handle along the given course of travel, the second, distal end of the moveable clevis assembly moves longitudinally through the lever portion receiving member which is mounted on the handle, and further, simultaneously forcibly cooperates with the biasing member to place the biasing member into compression, and wherein the distal end of the respective arms of the clevis engagement member forcibly, and cammingly engage the complimentary camming region which is defined by the spaced side plates.

6. The clamp as claimed in claim 5, and wherein the respective first and second movement defining passageways each have respective first and second ends, and wherein the respective fixed pin members are individually located at the first end of each of the first and second movement defining passageways when the moveable clevis assembly, which moveably cooperates with the handle, is located at the first end of the curved peripheral edge of the clevis engaging region, and the moveable object engaging member is located in the opened position, and wherein the respective pin members are further located at the second end of each of the respective first and second movement defining passageways when the moveable clevis assembly is located at the second end of the curved peripheral edge of the clevis engaging region, and the moveable object engaging member is in the closed position.

7. The clamp as claimed in claim 6, and wherein the predetermined path of movement of the moveable object engagement member between the opened and closed position causes the second end of the moveable object engagement member to travel along the second movement component downwardly, and along an arcuately shaped path of travel, and then travel along the first movement component inwardly and along a substantially linear path of travel, and in the direction of the main body of the clamp.

8. The clamp as claimed in claim 7, and wherein the moveable clevis assembly member has a rotational axis relative to the moveable object engaging member, and further has a longitudinal line of reference which extends along a longitudinal axis of the moveable clevis assembly, and then passes through the shoulder fastener which pivotally secures the handle to the respective side plates when the moveable object engagement member is located in the closed position, and wherein the rotational axis of the moveable clevis assembly is located over the center of the longitudinal line of reference when the moveable object engagement member is located in the closed position, and wherein the biasing member biasingly restrains the handle when the handle locates the moveable object engaging member in either the open or closed positions.

9. The clamp as claimed in claim 8, and wherein the clevis engaging region has a first end, defining a first, movement limiting seat, and which matingly engages the clevis engagement member, and which further, restricts the motion of the moveable clevis assembly, and the handle which cooperates with moveable clevis assembly, when the moveable object engagement member is in the open position, and wherein the clevis engaging region further has a second, movement limiting seat which matingly engages the clevis engagement member, and which further restricts motion of the moveable clevis assembly when the moveable object engagement member is located in the closed position.

10. The clamp as claimed in claim 9, and wherein the first end of the first movement defining passageway formed in the moveable object engaging member defines a pin seat which receives one of the fixed pins, and wherein the first movement defining passageway defines, at least in part, a first portion of the first movement component of the moveable object engagement member, and the second movement defining passageway defines, at least in part, a second portion of the first movement component, and the second movement component of the moveable object engagement member.

11. The clamp as claimed in claim 10, and wherein a passageway is formed through the handle, and a release pin is provided and which is received in the passageway and which releasably engages the clevis engaging region of the moveable object engagement member so as to prohibit motion of the object engagement member between the open and closed positions.

12. A clamp, comprising:
a main body having spaced, substantially parallel, side plates which have a lowermost peripheral edge which is secured to an underlying supporting surface, and an uppermost peripheral edge which defines, at least in part, a curved camming surface, and wherein the respective side plates each have a first, and an opposite, second end;
a shoulder fastener coupling the first end of each of the side plates together;
a first and a second fixed pin which individually extend between, and couple together the first and second side plates, and wherein the respective fixed pins are each located in a substantially perpendicular orientation relative to each of the side plates, and are further disposed in a predetermined, parallel, spaced orientation, one relative to the other;
a handle having a proximal end which is pivotally affixed to the first end of each of the side plates by the shoulder fastener, and which further has an opposite second end, and wherein the handle is reciprocally moveable along a given course of travel between a first and a second position;
a moveable object engagement member having a first and a second end, and top and bottom peripheral edges, and wherein a first and a second movement defining passageway are formed in, and extend through, the main body of the moveable object engagement member, and the first fixed pin is received through the first movement defining passageway, and the second fixed pin is received through the second movement defining passageway, and wherein a clevis engaging region is defined by the top peripheral edge, and is located near the first end of the moveable object engagement member;
an elongated moveable clevis assembly having a first end which is pivotally mounted on the first end of the moveable object engagement member, and which further matingly cooperates with the clevis engaging region thereof, and further has a distal second end which matingly and moveably cooperates with the second end of the handle, and wherein the first end of the moveable clevis assembly cammingly engages the curved camming surface which is defined by the uppermost peripheral edge of each of the respective side plates; and
a biasing member positioned between the first end of the elongated moveable clevis assembly and the handle, and which biasingly retains the handle in either the first or second position, and wherein movement of the handle between the first and second positions is effective in urging the moveable object engagement member along a predetermined path of travel from an open position, to a closed position, and wherein in the closed position the second end of the moveable object engagement member forcibly engages an object of interest.

13. The clamp as claimed in claim 12, and wherein the first movement defining passageway has a first end which has a pin seat for cooperating with the first fixed pin, and an opposite second end, and wherein the first movement defining passageway, acting in combination with the first fixed pin, defines, in part, a linear motion component of the moveable object engagement member as the object engagement member moves between the open and closed position, and wherein the second movement defining passageway has a first end, and an opposite second end, and wherein the second movement defining passageway further has a first course which, acting in combination with the second fixed pin, defines a vertical motion component of the moveable object engagement member as the moveable object engagement member travels between the open and closed positions, and wherein the second movement defining passageway further has a second course, which joins with the first course, and which further, in combination with the second fixed pin defines, in part, the linear motion component of the moveable object engagement member, and wherein the first and second fixed pins are located, respectively, at the first end of each of the first and second movement defining passageways when the moveable object engagement member is in the open position, and further are each, respectively located at the second end of the respective first and second movement defining passageways when the moveable object engagement member is located in the closed position.

14. The clamp as claimed in claim 13, and wherein the first end of the elongated moveable clevis assembly includes a clevis engagement member which is pivotally affixed to the first end of the moveable object engagement member, and which is further located adjacent to the clevis engaging region thereof, and a second, elongated lever portion which is affixed to the clevis engagement member, and which further defines the second, distal end of the moveable clevis assembly, and wherein the clevis engagement member has opposite, substantially spaced arms, and a base portion which extends between the substantially spaced arms, and wherein the spaced arms each have a distal end which defines a curved camming surface, and which forcibly and cammingly engage with the curved caroming surface which is defined by the uppermost peripheral edge of each of the respective side plates as the handle moves along the given course of travel between the first and second position to effect the subsequent movement of the moveable object engagement member between the open and closed positions.

15. The clamp as claimed in claim 14, and wherein the handle further comprises a lever portion receiving member which pivotally and movably receives, and matingly cooperates with the second, distal end of the movable clevis assembly, and wherein the second, distal end of the moveable clevis assembly is received, and passes through the lever portion receiving member, and wherein a restraining member engages the second, distal end of the moveable clevis assembly so as to prohibit the removal of the second end of the moveable clevis member from the lever portion receiving member, and wherein the biasing member is located between the clevis engagement member and the lever portion receiving member, and wherein movement of the handle along the given course of travel between the first and second position causes the biasing member to be placed into compression as the moveable object engagement member moves between the open and closed positions.

16. The clamp as claimed in claim 15, and wherein the clevis engaging region has a curved peripheral edge, and opposite first and second ends, and wherein the base portion of the moveable clevis engagement member is located in juxtaposed, spaced relation relative to the curved peripheral surface of the clevis engaging region, and wherein upon movement of the handle along the given course of travel between the first and second positions, the second, distal end of the moveable clevis assembly moves longitudinally through the lever portion receiving member which is mounted on the handle, and further, simultaneously forcibly cooperates with the biasing member to place the biasing member into compression, and wherein the distal end of the respective arms of the clevis engagement member simultaneous forcibly, and cammingly engage the curved camming surface which is defined by the uppermost peripheral edge of the respective side plates.

17. The clamp as claimed in claim 16, and wherein the clevis engaging region further has a first end, defining a first, movement limiting seat, and which matingly engages the base portion of the clevis engagement member, and which further, restricts the motion of the moveable clevis assembly, and the handle which cooperates with the moveable clevis assembly when the handle is in the first position, and the moveable object engagement member is in the open position, and wherein the clevis engaging region further has a second, movement limiting seat which matingly engages the base portion of the clevis engagement member, and further restricts motion of the moveable clevis assembly when the handle is located in the second position, and the moveable object engagement member is located in the closed position.

18. The clamp as claimed in claim 17, and wherein the moveable clevis assembly member has a rotational axis relative to the moveable object engagement member, and further has a longitudinal line of reference which extends along a longitudinal axis of the moveable clevis assembly, and then passes through the shoulder fastener which pivotally secures the handle to the respective side plates when the moveable object engagement member is located in the closed position, and wherein the rotational axis of the moveable clevis assembly is located over the center of the longitudinal line of reference when the moveable object engagement member is in the closed position, and the handle is in the second position, and wherein the biasing member biasingly restrains the handle when the handle is in each of the first and second positions, and thereby locates the moveable object engaging member in either the open or closed positions.

\* \* \* \* \*